United States Patent
Tu et al.

(10) Patent No.: US 7,577,242 B2
(45) Date of Patent: Aug. 18, 2009

(54) METHOD OF CONTROLLING THE USER CALLING LOAD IN SOFT SWITCH SYSTEM

(75) Inventors: Jiashun Tu, Shenzhen (CN); Lingjiang Mu, Shenzhen (CN); Ming Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 54 days.

(21) Appl. No.: 10/541,968

(22) PCT Filed: Dec. 23, 2003

(86) PCT No.: PCT/CN03/01108

§ 371 (c)(1),
(2), (4) Date: Apr. 3, 2006

(87) PCT Pub. No.: WO2004/064364

PCT Pub. Date: Jul. 29, 2004

(65) Prior Publication Data

US 2006/0188079 A1 Aug. 24, 2006

(30) Foreign Application Priority Data

Jan. 8, 2003 (CN) .............................. 03 1 14845

(51) Int. Cl.
*H04M 1/56* (2006.01)
(52) U.S. Cl. ............. 379/133; 379/112.01; 379/112.04; 379/112.1; 370/229; 370/232; 370/352
(58) Field of Classification Search ............ 379/112.01, 379/112.04–5, 112.09–1, 133–134, 137–139, 379/141, 112.1; 370/230–235, 229, 395.1
See application file for complete search history.

(56) References Cited

U.S. PATENT DOCUMENTS

| | | | | |
|---|---|---|---|---|
| 3,796,837 A | * | 3/1974 | Mathews | ............... 379/221.01 |
| 4,907,256 A | * | 3/1990 | Higuchi et al. | .............. 379/137 |
| 5,425,086 A | * | 6/1995 | Hidaka et al. | ............ 379/32.01 |
| 5,835,490 A | | 11/1998 | Park | ........................... 370/342 |
| 5,862,204 A | * | 1/1999 | Kim et al. | ................ 370/395.2 |
| 5,933,481 A | | 8/1999 | MacDonald | ................ 379/137 |
| 6,259,776 B1 | | 7/2001 | Hunt | ........................... 379/113 |
| 6,810,014 B1 | * | 10/2004 | Watanabe et al. | ........... 370/232 |
| 7,099,329 B1 | * | 8/2006 | Choudhury et al. | ...... 370/395.2 |
| 2005/0052994 A1 | * | 3/2005 | Lee | .............................. 370/230 |
| 2007/0036277 A1 | * | 2/2007 | Atkinson et al. | .............. 379/21 |

FOREIGN PATENT DOCUMENTS

CN           1275851 A           12/2000

* cited by examiner

*Primary Examiner*—Binh K Tieu
(74) *Attorney, Agent, or Firm*—Woodcock Washburn LLP

(57) ABSTRACT

The method of controlling the user calling load in Soft Switch system in present invention comprises the steps of: basic calling module receives the congestion direction message; judge whether the system congestion indicated by said congestion direction message is sporadic or sustaining; control the switching of user calling load according to the judgment whether the system congestion indicated by said congestion direction message is sporadic or sustaining. The aggressive effectiveness brought by present invention are: the system has the higher stability and reliability; when the traffic overload state occurs, the setup of maximum calling number can be guaranteed and the system can also restore to the normal load state. Soft module doesn't influence the setup of normal calling, nor does the setup of urgency special service calling; the system possesses good adaptability, the controlling of load is efficient and stable, and has the self-adapting overload controlling capability.

17 Claims, 2 Drawing Sheets

METHOD OF CONTROLLING THE USER CALLING LOAD IN SOFT SWITCH SYSTEM

FIELD OF INVENTION

The present invention relates to a method for service process in an electronic communication network system, and more particularly to a method of controlling call load in an IP network with a core soft switch system.

BACKGROUND OF THE INVENTION

Nowadays, information is highly centralized, and a telephone switch system frequently faces a burst of traffic peak. For example, during a certain period in a holiday or after a regional outburst event occurring, a large number of call requests congest local telephone networks, and then a calling connection may not be completed for a long time. Sometimes even the switch needs to reset its system, which not only interrupts emergency calling connection, but also directly affects service quality and equipment maintenance of switch system.

Traffic load is often controlled by a method of sharing traffic load in current techniques to promote flow of centralized burst traffic. But when an overflowed route is not idle and its certain calls are overflowed too, this method is unable to process the overflow traffic. On the contrary, network congestion can be aggravated by the method, when heavy overflow traffic occurs. Thus, this method is obviously not suitable for current complex and changeful traffic structure.

The same problem described above, namely how to control traffic load effectively, is faced in soft switch system that is the core equipment developing from circuit switching network to packet switching network, an important system in next generation of telecommunication network.

A prior art most related to the present invention is U.S. Pat. No. 5,933,481, which discloses "a method of controlling call traffic in a telecommunication system". The invention provides a method of dynamically altering the rate at which incoming offered calls are accepted, including the step of successively determining the offered call rate of the incoming offered calls. In this method when the offered calls increase, the system accepts the calls at a lower rate. For two gapping intervals used by the invention, the shorter gapping interval is used to accept the calls when the offered call rate is no greater than a set value; the longer gapping interval is used to accept the calls when the offered call rate exceeds the set value.

However, there are disadvantages in this method as follows:

A fluctuation can happen when processing burst calls, either accepting calls beyond system process capacity, or refusing some calls when system is able to accept calls. For example, within a short period of time, the system offers calls beyond system process capacity, and then subsequently the system could not offer any calls at all.

In a practical application, the load accepted by a system generally happens for a short time, which can't cause system congestion. Thus, all of offered calls can be processed by the system. If too many calls is continuously received within a period of time, the system should refuse to process some of the calls, in which, furthermore, the refused calls should not be emergency calls for special services.

The present invention provides a method of controlling call traffic load in an IP network to overcome current technical disadvantages.

SUMMARY OF INVENTION

The object of the invention is to provide a method of controlling call load in an IP network with a soft switch system as a core, in which, when mass traffic happens in the soft switch system, the rate of accepting calls is adjusted dynamically according to traffic load so as to quickly recover a normal traffic load and avoid congestion and congestion diffusion phenomena occurred in the soft switch system.

To achieve the above object, the technical solution of the invention includes the steps as follows:

A method of controlling call load in a soft switch system, including: receiving a congestion indication message in a basic calling module; deciding whether the system congestion indicated by the congestion indication message is in a type of burst or duration; implementing control for starting call load according to the decision of the burst or duration type for the system congestion.

Preferably, the step of deciding whether the system congestion indicated by the congestion indication message is in a type of burst or duration is implemented by using timer T1 and T2; the timer T1 is a shorter duration timer; the timer T2 is a longer duration timer.

Preferably, the step of receiving a congestion indication message in a basic calling module further includes as follows: deciding whether or not it is first time for the basic calling module to receive a congestion indication message; if yes, setting a traffic load status as a lowest level of overload status, and initiating the timer T1 and T2.

Preferably, the step of deciding whether the system congestion indicated by the congestion indication message is in a type of burst or duration, further includes: deciding whether the timer T1 and T2 is overtime or not; if the timer T1 is not overtime, implementing a normal call process in the basic calling module; if the timer T1 is overtime but the timer T2 is not overtime, which indicates that the system congestion indicated by the congestion indication message may be in a type of duration, reinitiating the timer T1 and T2; if the timer T1 is overtime but the timer T2 is not overtime, and the traffic load status is the highest level of overload status, sending a congestion alarm to an operation and maintenance system (OAM) from the basic calling module; if both the timer T1 and the timer T2 are overtime, which indicates that the system congestion indicated by the congestion indication message is in a type of burst, reinitiating the timer T2; if both the timer T1 and the timer T2 are overtime and the traffic load status reaches normal status, implementing a normal call process in the basic calling module.

Preferably, the step of implementing control for starting call load, further includes the steps as follows: refusing to accept non-emergency calls, when the system congestion indicated by congestion indication message is in a type of duration; and dropping the traffic load status down one level and decreasing a rate of refusing calls, when the system congestion indicated by congestion indication message is in a type of burst.

Preferably, the step of refusing to accept non-emergency calls, further includes the steps as follows: moving the traffic load status up one level; counting a number of call requests received; working out a rate of refusing calls by using a traffic load controlling algorithm; refusing to accept non-emergency calls according to the rate of refusing calls.

Preferable, the rate of refusing calls is in direct proportion to a number of calls that should be refused to accept except emergency calls; the rate of refusing calls is in inverse proportion to a number of calls that is counted subsequently after the current call requests is started to count; the number of calls that should be refused to accept except emergency calls is bigger than or equal to the number of calls that is counted subsequently after the current call request is started to count.

Preferably, the traffic load control algorithm is calculated in accordance with a process load of the soft switch system in the IP network, and load of related data bearer network.

Preferably, the process load of the soft switch system is obtained according to the following parameters: a rate of time occupied by CPU inside the soft switch system; traffic of communication for each software module inside the soft switch system; a average time delay for access of database inside the soft switch system; a memory capacity occupied by the call processing inside the soft switch system, and a percentage of free memory; and a process load percentage and message forwarding delay of communication process equipments inside the soft switch system.

Preferably, the load of related data bearer network is obtained according to the following parameters: a traffic percentage of each date port, a communication delay in each router, a communication jitter in each router, a communication packet lost rate in each router, and adjacent network traffic.

Preferably, the following conditions must be satisfied for controlling the traffic load by the traffic load control algorithm:

emergency calls is ensured unblocked; calls from important users and priority users are ensured; calls from normal users are limited by a four level mode, in which call restraint rates are 50%, 75%, 87.5% and 100%; when traffic load is caused by a media stream, the soft switch system should shunt traffic of related date network, though soft switch itself is not overloaded; when traffic congestion is caused by a media stream, the coding mode of the media stream is controlled to reduce media traffic, for example, original G.711 coding mode providing voice quality is changed into G.732 or G.729 mode adopting high compression rate.

The active effect brought by the present invention is that the system has higher stability and reliability. Once traffic overload status occurs, connections with the maximum number of calls are ensured, and the system could be recovered to normal load status quickly. Normal call connections are not interrupted by soft modules, and connections for emergency calls for special services are not blocked by overloaded traffic. This method is suitable for wide applications, and its traffic load control is smooth and effective with a adaptive overload control capability.

Example embodiments will be described in details below with reference to the accompanying drawings for further and comprehensive understanding for the object, characteristics and merits about the present invention.

DETAILED DESCRIPTION OF THE INVENTION

When the call traffic received by the soft switch system has exceeded the traffic load capability that the system can handle, a congestion indication message is sent to a basic calling module. No action is taken for all congestion indication messages received during timer T1, and its purpose is to make ensure no quick drop for the system traffic and also be able to effectively identify whether the system is overloaded within duration of very short time.

The present invention will be further described below with reference to the accompanying drawings.

Figure 1:
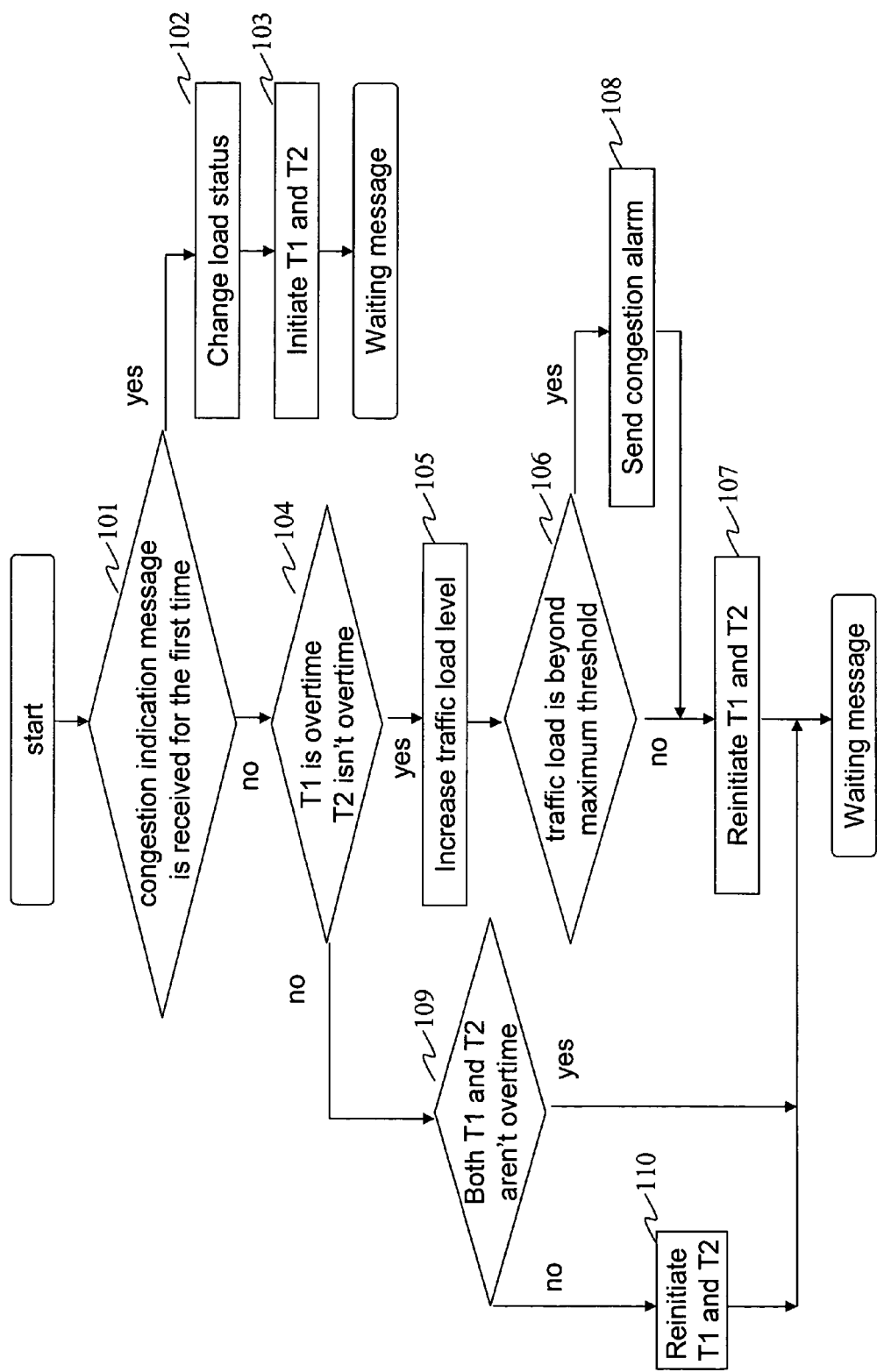
FIG. 1 is a flow chart depicting a basic calling module of a soft switch system in traffic overload status.

As shown as FIG. 1, in step 101, it is checked whether or not the congestion indication message is received by the basic calling module for the first time. If yes, change the traffic load status of system and set it as the lowest level (step 102), and also set the two timers, T1 with a shorter duration and T2 with a longer duration (step 103).

If no, it is checked whether the timer T1 is overtime and T2 is not overtime (step 104); if yes, the traffic load status of basic calling module is moved one level up (step 105), and then it is checked whether the traffic load added is beyond the maximum threshold or not (step 106); If yes, the timers T1 and T2 is reinitiated (step 107); if no, which is explained that the system still has the congestion indication message although the traffic load status of the basic calling module has reached to the highest level, send the congestion indication message to OAM (step 108); then end the current service flow, and enter to a status of waiting message.

If in step 104, the timer T2 is overtime, which is indicated that the congestion indication message has not been received during a duration of T2, the traffic load status is dropped one level down, and T2 is reinitiated; if at this time the T2 is overtime again, the traffic load status is dropped one level down again, until the traffic load status is recovered to a normal status; it is further checked whether neither the two timers T1 and T2 are overtime (step 109); if yes, enter directly to a waiting status; if no, the two timers T1 and T2 are reinitiated (step 110), and then enter to a waiting status.

Figure 2:
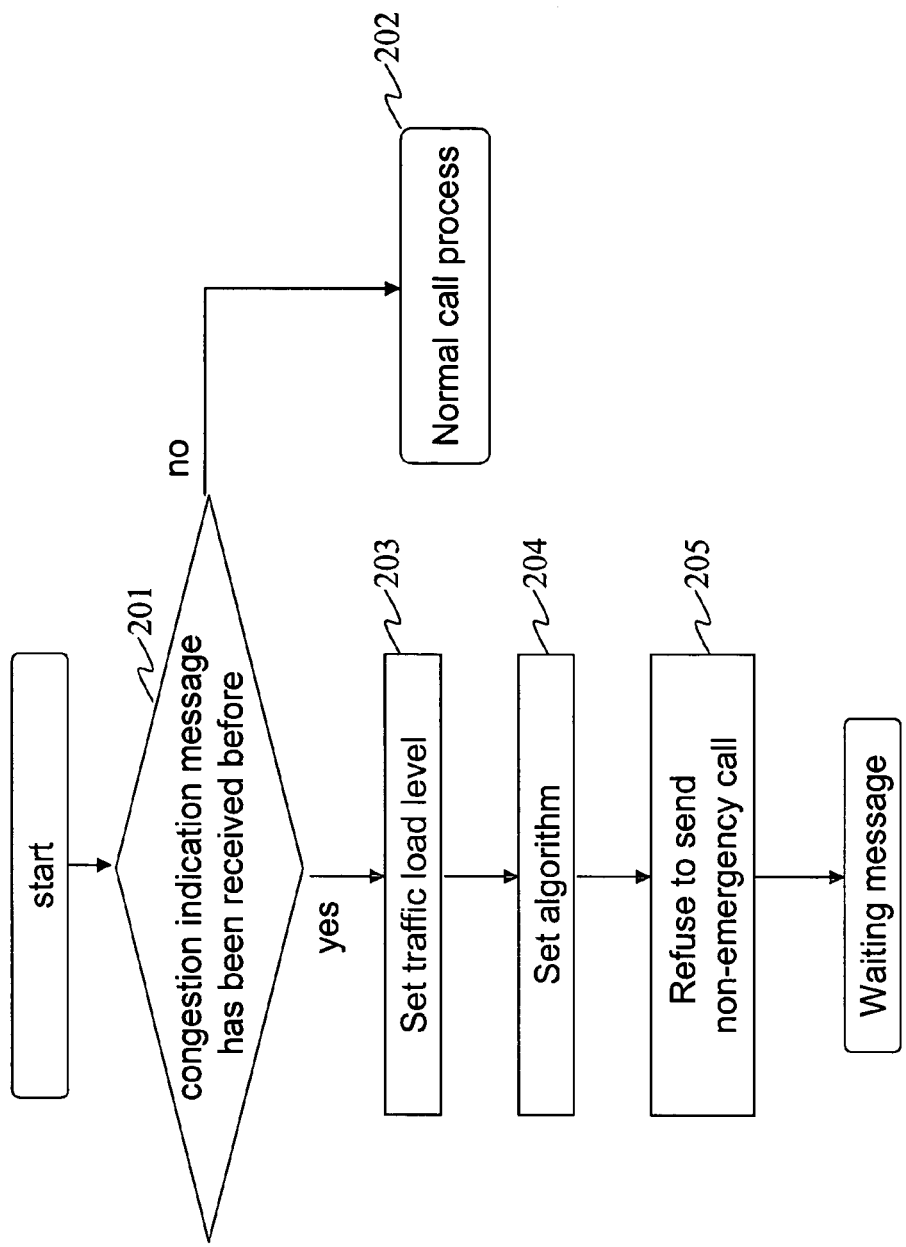
FIG. 2 is a flow chart depicting a call process of a basic calling module.

As shown as FIG. 2, firstly it is checked whether the basic calling module has received a congestion indication message, namely whether currently the system has been in a status of traffic overload (step 201); if no, process calls normally (step 202); if yes, which is indicated that the system now has been in an overload status, set a current traffic load level (step 203), then set the corresponding algorithm according to the traffic load level (step 204) to work out the rate of refusing to accept non-emergency calls. The detail algorithm is as follows: starting from the current call, m calls should be refused to accept within subsequent n calls, (m≦n), in which emergency calls should not be included in the m calls. Therefore, the rate of refusing to accept calls is:

$$p=m/n$$

The traffic load levels can be preset according to actual performance of the soft switch equipment. In general, p=0, namely no calls need be refused. When the traffic load increases up to the status on which traffic load should be controlled, the value of p should be adjust to p>0. If at this time the traffic load still increases continuously, p should be increased continuously. When p=1, it is indicated that all calls (except emergency calls) are restricted, in this way the system could always run in a preset safe range. Then run the step of refusing to accept non-emergency calls (step 205).

Thus, the service flow is ended and the system enters into a status of waiting message.

In the present invention, the algorithm for controlling traffic load is worked out according to the process load of the soft switch itself and the load of related data bearer network.

The process load of the soft switch itself can be obtained according to the following parameters:

a rate of time occupied by CPU inside the soft switch system;

a traffic of communication for each software module inside the soft switch system;

a average time delay for access of database inside the soft switch system;

a memory capacity occupied by the call processing inside the soft switch system, and the percentage of free memory; and a process load percentage and message forwarding delay of communication process equipment inside the soft switch system.

The load of related data bearer network can be obtained according to the following parameters:

a traffic percentage of each date port;

a communication delay in each router;

a communication jitter in each router;

a communication packet lost rate in each router; and adjacent network traffic.

The following principles should be included for controlling traffic load by the traffic load control algorithm:

emergency calls (such as 110, 119, 112) should be ensured unblocked;

calls from important users and priority users (such as government departments, armed forces, and polices) should be ensured; calls from normal users are limited by a four level mode, in which call restraint rates are 50%, 75%, 87.5% and 100%;

when traffic load is caused by a media stream (in a soft switch system, the soft switch solely completes call process, while the media stream switch is completed by data network), the soft switch system should shunt traffic of related date network though soft switch itself is not overloaded; and when traffic congestion is caused by a media stream, the coding mode of the media stream is controlled to reduce media traffic, for example, original G.711 coding mode providing voice quality is changed into G.732 or G.729 mode adopting high compression rate.

All above description is only preferable embodiments of the present invention, which should not be seen as a limitation for the invention, and the scope of the invention claimed for protection shall not limited to these description. According to the technologies disclosed by the invention, any equivalent modifications and variances made by a person skilled in the art should fall into the scope claimed by the invention.

What is claimed:

1. A method of controlling a call load in a soft switch system, comprising:

receiving a congestion indication message from a basic calling module;

deciding whether a system congestion indicated by the congestion indication message is a burst or duration type of congestion, implemented by using a first timer T1 and a second timer T2; and implementing a control for starting the call load according to a decision of the burst or duration type for the system congestion.

2. A method as recited in claim 1, wherein the first timer T1 is a shorter duration timer, and the second timer T2 is a longer duration timer.

3. A method as recited in claim 1, wherein the step of receiving the congestion indication message in the basic calling module further includes the steps of:

deciding whether or not it is a first time for the basic calling module to receive the congestion indication message; if yes, setting a traffic load status at a lowest level of an overload status, and initiating the first timer T1 and second timer T2.

4. A method as recited in claim 1, wherein the step of deciding whether the system congestion indicated by the congestion indication message is burst or duration type, further includes the steps of:

deciding whether the first timer T1 and second timer T2 are overtime or not;

if the first timer T1 is not overtime, implementing a normal call process in the basic calling module;

if the first timer T1 is overtime but the second timer T2 is not overtime, which indicates that the system congestion indicated by the congestion indicating message may be a duration type, reinitiating the first timer T1 and the second timer T2;

if the first timer T1 is overtime but the second timer T2 is not overtime, and the traffic load status is a highest level of an overload status, sending a congestion alarm to an operation and maintenance system from the basic calling module;

if both the first timer T1 and the second timer T2 are overtime, which indicates that the system congestion indicated by the congestion indication message is in a type of burst, reinitiating the second timer T2; and if both the first timer T1 and the second timer T2 are overtime, and the traffic load status reaches normal status, implementing a normal call process in the basic calling module.

5. A method as recited in claim 1, wherein the step of implementing control for staffing call load further includes the steps of:

refusing to accept each of at least one non-emergency calls, when the system congestion indicated by the congestion indicating message is duration type; and dropping a traffic load status down one level and decreasing a rate of refusing calls, when the system congestion indicated by congestion indication message is in a type of burst.

6. A method as recited in claim 5, wherein the step of refusing to accept non-emergency calls, further includes the steps of:

moving the traffic load status up one level;

counting a number of call requests received;

working out a rate of refusing calls by using a traffic load controlling algorithm; and refusing to accept non-emergency calls according to the rate of refusing calls.

7. A method as recited in claim 6, wherein the rate of refusing calls is in direct proportion to a number of non-emergency calls that should be refused.

8. A method as recited in claim 6, wherein the rate of refusing calls is in inverse proportion to a number of calls that are counted after a current call requests is counted.

9. A method as recited in claim 7, wherein the number of non-emergency calls that should be refused is greater than or equal to the number of calls that are counted after a current call request is counted.

10. A method as recited in claim 6, wherein the traffic load control algorithm is worked out in accordance with a process load of the soft switch system in an internet protocol (IP) network, and a load of a related data bearer network.

11. A method as recited in claim 10, wherein the process load of the soft switch system is obtained according to the following parameters:

a rate of time occupied by a central processing unit (CPU) inside the soft switch system;

a traffic of communication for each of a plurality of software modules inside the soft switch system;

an average time delay for accessing a database inside the soft switch system;

a memory capacity occupied by a call processing inside the soft switch system, and a percentage of free memory; and a process load percentage and a message forwarding delay of at least one piece of communication process equipments inside the soft switch system.

12. A method as recited in claim 10, wherein the load of the related data bearer network is obtained according to the following parameters:

a traffic percentage of each of at least one data port, a communication delay in each of at least one router, a communication jitter in each router, a communication packet lost rate in each router, and an adjacent network traffic.

13. A method as recited in claim 6, wherein the following conditions must be satisfied for controlling a traffic load by the traffic load control algorithm:

each of at least one emergency calls is ensured to be unblocked;

each of at least one calls from a plurality of important users and priority users is ensured to be unblocked;

a four-level mode is adopted to limit each of at least one calls from normal users, in which a plurality of call restraint rates are 50%, 75%, 87.5% and 100%, respectively;

when the traffic load is caused by a media stream, the soft switch system should shunt a traffic of a related data network, though the soft switch itself is not overloaded; and when a traffic congestion is caused by a media stream, a coding mode of the media stream is controlled to reduce a traffic of the media stream, for example, an original G.711 coding mode providing voice quality is changed into a G.732 or a G.729 mode adopting a high compression rate.

14. A method as recited in claim 2, wherein the step of receiving a congestion indication message in the basic calling module further includes the steps of:

deciding whether or not it is a first time for the basic calling module to receive a congestion indication message; if yes, setting a traffic load status as a lowest level of an overload status, and initiating the first timer T1 and the second timer T2.

15. A method as recited in claim 2, wherein the step of deciding whether the system congestion indicated by the congestion indication message is burst or duration type, further includes the steps of:

deciding whether the first timer T1 and second timer T2 are overtime or not;

if the first timer T1 is not overtime, implementing a normal call process in the basic calling module;

if the first timer T1 is overtime but the second timer T2 is not overtime, which indicates that the system congestion indicated by the congestion indicating message may be a duration type, reinitiating the first timer T1 and the second timer T2;

if the first timer T1 is overtime but the second timer T2 is not overtime, and the traffic load status is a highest level of an overload status, sending a congestion alarm to an operation and maintenance system from the basic calling module;

if both the first timer T1 and the second timer T2 are overtime, which indicates that the system congestion indicated by the congestion indication message is in a type of burst, reinitiating the second timer T2; and if both the first timer T1 and the second timer T2 are overtime, and the traffic load status reaches normal status, implementing a normal call process in the basic calling module.

16. A method as recited in claim 8, wherein the number of non-emergency calls that should be refused is greater than or equal to the number of calls that are counted after a current call request is counted.

17. A method as recited in claim 10, wherein the following conditions must be satisfied for controlling the traffic load by the traffic load control algorithm:

each of at least one emergency calls is ensured to be unblocked; each of at least one calls from a plurality of important users and priority users is ensured to be unblocked;

a four-level mode is adopted to limit each of at least one calls from normal users, in which a plurality of call restraint rates are 50%, 75%, 87.5% and 100%, respectively;

when the traffic load is caused by a media stream, the soft switch system should shunt a traffic of a related data network, though the soft switch itself is not overloaded; and when a traffic congestion is caused by a media stream, a coding mode of the media stream is controlled to reduce a traffic of the media stream, for example, an original G.711 coding mode providing voice quality is changed into a G.732 or a G.729 mode adopting a high compression rate.

* * * * *